Sept. 30, 1930.                J. W. WOOD                1,776,962
                        CENTRIFUGAL CAPPING MELTER Filed March 13, 1929         2 Sheets-Sheet 1

Inventor

JAMES W. WOOD

By Fenelon B. Brock

Attorney

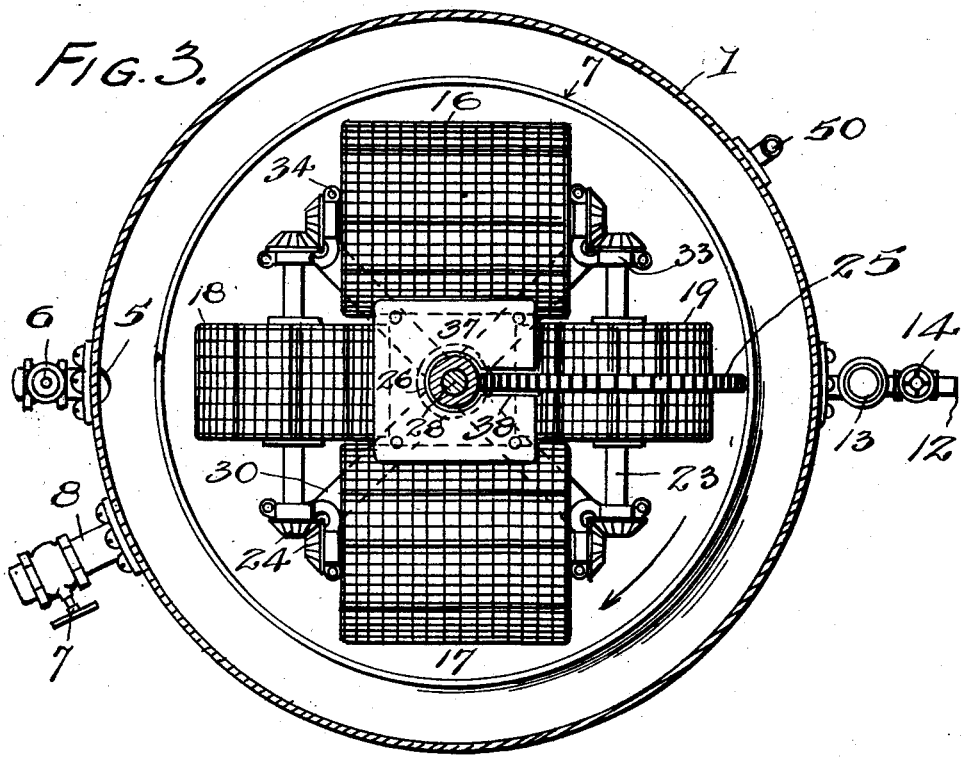
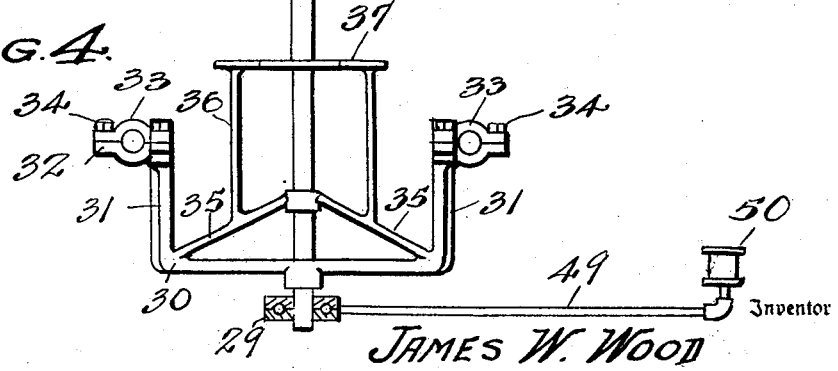

Patented Sept. 30, 1930

1,776,962

UNITED STATES PATENT OFFICE

JAMES W. WOOD, OF TWIN FALLS, IDAHO

CENTRIFUGAL CAPPING MELTER

Application filed March 13, 1929. Serial No. 346,758.

In the customary process of extracting honey, the full combs are emptied of the honey and the combs are then returned to the bee hive for refilling. Before the honey is thus emptied or extracted from the full comb, it is first necessary to slice off the "capping" or outside wax covering of the comb. The capping when sliced from the honeycomb includes honey as well as wax, the proportion of the honey to the wax depending upon the depth of the cut or slice.

The machine of my invention is designed to separate this honey and wax by a centrifugal process so that both elements may be recovered for their respective uses, the honey being first removed in its natural state, and the wax being melted and then removed ready for the market.

In carrying out my invention I utilize centrifugal force created by the use of a plurality of foraminous separators or cylinders which revolve about a common center and also rotate on their respective axes for separating and extracting the honey, and as the honey is separated from the wax, the latter falls by gravity and is deposited upon a heating surface from which the melted wax is removed, the separation and removal of the honey and wax being accomplished simultaneously and continuously.

My invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have so far devised for the practical application of the principles of my invention.

Fig. 3 is a horizontal sectional detail view at line 3—3 of Fig. 1.

Fig. 4 is a detail view of the rotary shaft and the rotor frame rigid with the shaft.

Figure 1:
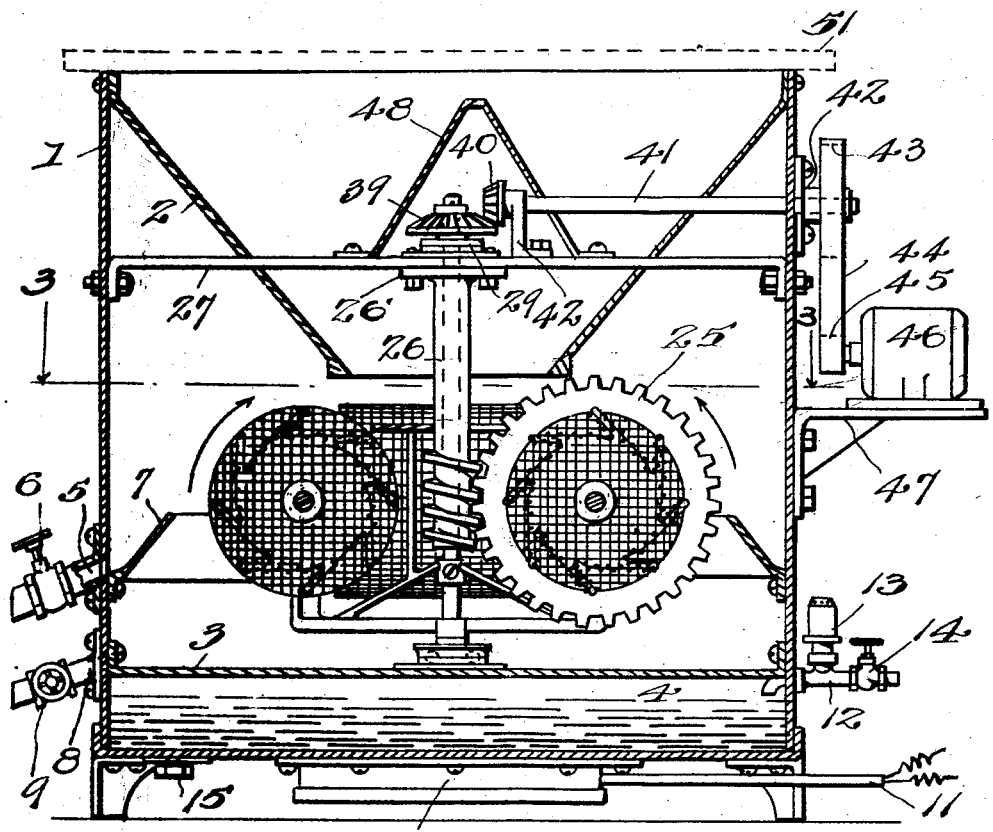
Figure 1 is a vertical sectional view of the machine of my invention.
Figure 2:
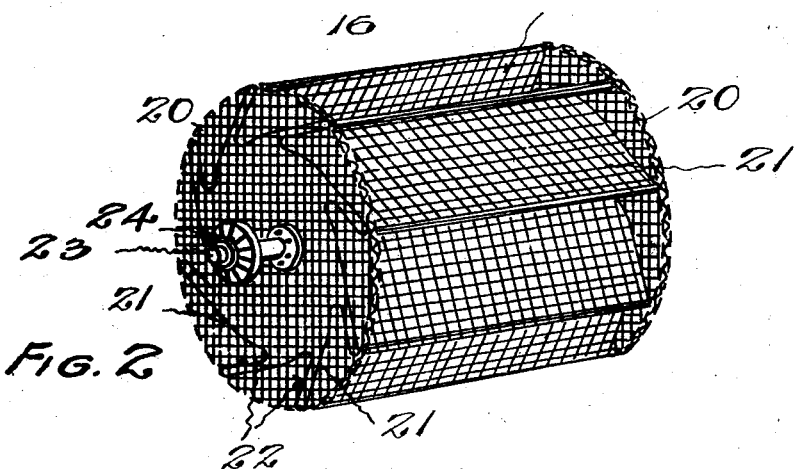
Fig. 2 is a perspective view of one of the rotor screen-separators.

In the preferred form of my invention as shown in the drawings I employ a cylindrical vessel or tank 1 which is provided at its upper end with a funnel-shaped hopper 2 that is secured at the top of the tank and which projects downwardly a suitable distance within the tank. The tank is provided with a double bottom which includes the elevated partition or bottom 3 and this double bottom forms a water and steam chamber 4 in the lower portion of the tank.

The honey which is separated in the tank is drawn off through an outlet pipe 5 having a valve 6 and this outlet pipe is connected with a trough 7. The trough 7 is an annular frusto-conical shaped device which is secured at the inner side of the tank and this trough receives the extracted or separated honey which is thrown by centrifugal force against the inner face of the wall of the tank. The honey on the wall of the tank flows down its face and is caught by the annular trough from which it is drawn off by the outlet pipe 5.

An outlet pipe 8 is provided for the melted wax, and a valve 9 is employed in this pipe. The wax, after the honey has been separated therefrom, falls on the elevated bottom or heating surface 3 and is melted there by the steam in the steam chamber 4, and this melted wax may be drawn off through the outlet pipe 8.

The water in the steam chamber 4 may be heated in any suitable manner, the heating medium here shown being an electric heater within a casing 10 secured at the bottom of the tank, and the electric wires are introduced to the heater within the casing 10 through the customary pipe 11.

Water may be introduced to the steam chamber or boiler 4 through a pipe 12 and this pipe is provided with a safety valve 13 to dispose of excess steam, and a control valve 14, for use in controlling either steam or water.

The water, of course, is introduced to the boiler for steaming purposes, and excess steam in the boiler may be employed for power purposes, if desired. The bottom of the boiler is provided with a drain or outlet 15.

Within the tank is supported a rotor which comprises a plurality of revolving separators, here shown as 16 and 17 and 18 and 19. These separators are foraminous cylinders preferably fashioned from wire screen and each cylinder is provided with ends or circular heads 20. The annular walls of the cylinders are fashioned with folds that form blades 21 and 22 and each cylinder is secured upon its shaft 23. At both ends of the cylinder shaft are provided bevel gears 24. The cylinder with its fluted or folded wall, the ends or heads, the shaft and the bevel gears are all rigidly secured together, as by welding or any other suitable manner.

As seen in Fig. 3, the separator screens 16, 17, 18 and 19 are arranged in diametrical pairs about the center of the tank, the two large screens 16 and 17 being opposed and the two smaller screens or separators 18 and 19 being oppositely disposed, and it will be seen that these separator screens in their horizontal positions afford an extensive area for the reception of the honey and wax as they are to be separated. The four screen separators revolve on their axes, the upper portion of each screen turning inwardly toward the center of the tank. The separator 19, as seen in Fig. 3 is provided with a gear 25 which meshes with a tubular screw 26 located at the vertical center of the tank. At its upper end this tubular screw has a flange 26′ that is bolted to the underside of a cross-plate 27. This plate passes transversely through the funnel-hopper 2 and is bolted at its ends to the sides of the tank. The tubular screw 26 thus is rigidly held and depends from the cross-bar or plate 27.

Within the tubular screw a rotary shaft 28 is enclosed, said shaft forming part of a rotor frame upon which are carried the plurality of screen separators. The rotary shaft 28 is supported at its upper and lower ends by suitable bearings 29 and this shaft with the rotor frame is designed to rotate at high speed in the bearings.

At the lower end of the shaft a number of spokes 30 are rigidly secured thereto, and each of these spokes has an upright post 31 which terminates in a bearing 32, and each bearing has a cap 33 secured by bolts as 34. As seen in Fig. 3 the shafts 23 of the screen separators are journalled in these bearings and of course the screen separators rotate with their shafts.

Diagonal braces 35 are used to brace the spokes and posts from the shaft 28 and from these braces rise supporting rods 36 upon which is supported a rotor plate 37. This plate may be of any suitable shape and it is provided with an opening for the tubular screw and also with a slot 38 for the gear 25. The entire rotor frame and shaft as shown in Fig. 4 is bodily rotated in the bearings 29 and the distributing plate 37 of course rotates with this frame. The parts of the frame are rigidly secured together by welding or any other desired manner. In Fig. 1, it will be seen that the separator plate is located directly below the small mouth of the hopper 2, and the capping material slides down this hopper on to the rapidly revolving plate 37. The material is thrown by centrifugal force from this plate against the in-turning upper sides of the screen separators. The honey is separated by the centrifugal force and is passed through the separator screens and thrown against the inner face of the cylinder wall of the tank 1.

The wax is also thrown off on the plate against the in-turing portions of the screen separators and it will be apparent that the fluted or folded portions of these foraminous cylinders gather the portions of wax and convey them inwardly toward the center of the tank. The wax is thus caught and conveyed by the rotating separator screens and is eventually deposited on the bottom 3 of the tank.

It will be understood that the screens together with the rotor frame and shaft 28 are revolving at high speed and therefore the honey is thrown outwardly through the rotating screens. The shafts 23 of the screen separators all revolve continuously and uniformly through the action of the spur gear 25 which is in mesh with the screw 26, and the rotation of the spur gear 25 about the axis of the tubular screw causes the spur gear 25 and the screen separators to revolve at a comparatively lower speed than the speed of the rotor frame. The wax is thus deposited upon the heating plate 3 and it is there heated and drawn off as described.

The rotor is revolved through the medium of a driven gear 39 at its upper end with which a pinion 40 meshes, the pinion being mounted on a power shaft 41 that is journalled in bearings 42 in the upper portion of the tank. The shaft 41 extends through the wall of the tank and also through the wall of the funnel-hopper, and exterior of the tank the shaft has a pulley 43. A drive belt 44 passes over this pulley and also over a driving pulley 45 on the shaft of an electric motor 46. The motor 46 is supported exterior of the tank upon a suitable bracket 47 and the motor is designed to operate the rotor through the transmission mechanism heretofore described.

A conical shaped guard or cap 48 which is supported from the cross-bar 27 is used to prevent the capping material from falling on the gear couple 39—40. An oil pipe 49 and oil cup 50 are shown in Fig. 4 to indicate lubrication for the bearings 29.

The comb is placed upon a removable bar indicated by dotted lines in Fig. 1 as 51 and the capping is sliced from the full comb and falls into the hopper as described.

It will thus be apparent that the material is fed through the hopper to the distributing plate 37 and from this plate the material is distributed, the honey passing through the foraminous separators or rotating screens, and by centrifugal action is deposited on the vertical walls of the tank. The honey thus collected flows down the inside face of the tank wall to the trough 7.

By the planetary gearing, the separator screens are revolved in the direction of the arrows in Figure 1, and the dry wax is thrown against the in-turning longitudinally extending folds or flutes as the separator screens turn their upper portions toward the center of the machine.

The rotor frame revolves rapidly on its vertical axis while the separator screens revolve at much slower speed on their horizontal axes, thus, by centrifugal force separating the honey and throwing it out to the wall of the tank, while the wax is caught by the folds of the inturning portions of the separator screens, and emptied from these folds to the heated bottom plate 3.

The accumulated honey is drawn off from the trough, and the melted wax is drawn off from the heated plate at suitable intervals, but it will be understood that the separation of these elements and the heating of the separated wax proceeds continuously while the motor 46 is operating.

Having thus fully described my invention, what I claim as new and desire to secure by Letters Patent is:

1. The combination in a centrifugal separating machine with a central stationary exteriorly threaded tube, of a rotor frame including a driven shaft supported within the tube, a central distributor-plate rigid with the frame, two pairs of diametrically arranged foraminous separators disposed about the tube and plate, shafts for said separators journalled in the frame, gear couples connecting adjoining ends of the shafts, and a gear wheel mounted on one of said separators for engagement with the threaded tube.

2. The combination in a centrifugal separating machine with a rotor frame and driving means therefor, of a plurality of cylindrical foraminous separators having shafts journalled in the frame, and planetary gearing for said shafts, said foraminous separators having longitudinally extending folds in their cylindrical walls, and a central distributor-plate intermediate said separators and rigid with said frame.

3. The combination in a centrifugal separating machine with a rotor frame and driving means therefor, of a plurality of cylindrical screen-separators having shafts journalled in said frame and planetary gearing for revolving said shafts and screen-separators, longitudinally extending folds in the cylindrical walls of the screen separators, and a central distributing plate intermediate the separators and rigid with the frame.

4. The combination in a centrifugal separating machine with a rotor frame including an upright driven shaft and bearing supports therefor, of a plurality of cylindrical, foraminous, separators having horizontal journals to revolve in unison in the frame, means for revolving the separators, and a central distributer plate rigid with the frame and located intermediate said separators.

5. The combination with a tank having a bottom and heating means therefor, and an interior elevated trough within the tank, of a rotor frame including a central upright shaft, a plurality of cylindrical, foraminous, separators having horizontal shafts journaled in the frame, means for rotating the frame, planetary gearing for rotating the separator shafts, and a central distributing plate intermediate the separators.

JAMES W. WOOD.